US008464432B2

(12) United States Patent
Béchamp et al.

(10) Patent No.: US 8,464,432 B2
(45) Date of Patent: Jun. 18, 2013

(54) CENTERLESS SAW DEVICE

(76) Inventors: Paul Béchamp, Gatineau (CA);
Stéphane Campeau, Limoges (CA)

( * ) Notice: Subject to any disclaimer, the term of this patent is extended or adjusted under 35 U.S.C. 154(b) by 0 days.

(21) Appl. No.: 13/154,152

(22) Filed: Jun. 6, 2011
(Under 37 CFR 1.47)

(65) Prior Publication Data
US 2012/0304468 A1 Dec. 6, 2012

Related U.S. Application Data (63) Continuation of application No. 12/350,021, filed on Jan. 7, 2009, now Pat. No. 8,028,425, which is a continuation-in-part of application No. 12/048,983, filed on Mar. 14, 2008, now abandoned.

(60) Provisional application No. 61/103,463, filed on Oct. 7, 2008.

(51) Int. Cl.
*B27B 9/00* (2006.01)
(52) U.S. Cl.
USPC .............. 30/389; 30/276; 30/347; 30/390
(58) Field of Classification Search
USPC .......... 30/389, 388, 347, 276, 123.3, 390, 30/514, 515, 517; 83/490, 676; 451/344, 451/358; 125/13.01, 12, 20, 11.22
See application file for complete search history.

(56) References Cited

U.S. PATENT DOCUMENTS 3,221,783 A * 12/1965 Kaltenmark et al. .......... 30/376
3,930,310 A * 1/1976 Santilli ........................... 30/389
4,316,328 A * 2/1982 Duggan et al. ................. 30/389
5,009,011 A * 4/1991 Johansson ...................... 30/389
5,545,079 A 8/1996 Larsson et al.
5,674,119 A 10/1997 DesRosiers
6,336,273 B1 * 1/2002 Nilsson et al. ................ 30/389
2006/0064881 A1 * 3/2006 Blatz ............................. 30/389
2007/0261254 A1 * 11/2007 Donnerdal et al. ............ 30/389

FOREIGN PATENT DOCUMENTS

| DE | 30017 | 5/1884 |
|---|---|---|
| DE | 1240647 | 5/1967 |
| DE | 1502705 | 1/1970 |
| DE | 2435585 | 2/1976 |
| DE | 20022482 | 12/2001 |
| EP | 0060971 | 9/1982 |
| EP | 1479470 | 11/2004 |
| FR | 804061 | 10/1936 |
| FR | 2674469 | 10/1992 |
| GB | 2095168 | 9/1982 |

\* cited by examiner

*Primary Examiner* — Phong Nguyen
(74) *Attorney, Agent, or Firm* — Merchant & Gould P.C.

(57) ABSTRACT

The present invention generally pertains to a saw device. More particularly, the present invention relates to a handheld centerless saw. The saw comprises a frame and a pair of driving rollers mounted to the frame for rotation. The saw also comprises an annular blade mounted between the drive rollers and functionally engaged thereby, where the blade defines frontward and backward hemispheres. At least two guide wheels are mounted to the frame, or to a cover mounted to the frame, the guide wheels being positioned in the backward hemisphere of the blade. The guide wheels are operatively engaging the inner circular edge of the blade. A drive assembly mounted to the frame is operable for urging the countersense rotation of drive rollers, thereby causing rotation of the blade.

9 Claims, 9 Drawing Sheets

CENTERLESS SAW DEVICE

This application is a Continuation of U.S. patent application Ser. No. 12/350,021, filed Jan. 7, 2009, which claims benefit of Ser. No. 12/048,983, filed Mar. 14, 2008 in the U.S. and claims benefit of Ser. No. 61/103,463, filed Oct. 7, 2008 in the United States and which applications are incorporated herein by reference. To the extent appropriate, a claim of priority is made to each of the above disclosed applications.

FIELD OF THE INVENTION

The present invention generally relates to a saw. More specifically, the present invention relates to a centerless saw device comprising an annular blade driven by a pair of countersense rotation driving rollers.

BACKGROUND OF THE INVENTION

Circular saw devices typically involve a circular or disc blade having an axial perforation or hole in its center. The blade is mounted to the blade using a shaft extending through the center hole and rotation thereof is driven by holding members concentrically mounted on the shalt and frictionally engaging the side faces of the blade.

Due to the presence of the shaft and of the holding members, the depth of cut of circular saws tends to be limited to less than the radius of blade. Therefore, some have come up with circular saw configurations where an annular blade is eccentrically driven. Such a configuration is described in U.S. Pat. Nos. 4,352,241, 4,472,880 and 4,793,065.

Briefly, these documents describe saw configurations where an annular blade is positioned between opposed rollers contacting the lateral faces of the blade. A driving roller in engaging the inner edge of the annular blade and rotation thereof drives the rotation of the blade about a virtual rotation axis. While such configurations allow increasing the depth of cut beyond the center of the blade, additional torque on the blade is required as the blade cuts deeper in the material. As the surface of the blade engaged by the drive rollers of the saw described in the prior art is very limited, slippage in-between the drive and saw blade have become a problem, thereby functionally limiting the depth of the cut.

Other annular saw configuration have been reported, where an annular blade is driven by a roller frictionally engaging one lateral face of the blade. Again, these configurations of the prior art tend to be unsatisfactorily since they do not overcome torque-related issues.

It would thus be advantageous to be provided with an annular saw capable of cutting beyond the rotation axis or center of the annular blade while maintaining sufficient torque between the drive rollers and the blade to satisfactorily enable such cutting depth.

SUMMARY OF THE INVENTION

In order to address the above and other drawbacks, and in accordance with the present invention, there is disclosed a centerless saw device.

In one embodiment, the centerless saw device comprises a frame and at least a first and a second drive rollers mounted to the frame for rotation about first and second rotation axes. The device further comprises an annular blade mounted between the first and second drive rollers and frictionally engaged thereby. At least two guide wheels are mounted to the frame, the guide wheels operatively engaging the inner circular edge of the annular blade. A drive assembly is mounted to the frame for urging rotation of the first and second drive rollers, thereby urging rotation of the annular blade.

In one feature, the device comprises a handheld saw device, a table saw device or a compound saw device.

In a further feature, the drive assembly is adapted for driving a countersense rotation of the drive rollers in a 1:1 ratio.

In yet a further feature, the drive assembly comprises a motor and a transmission operatively coupled to the motor. The motor may be selected from a group consisting of a gas motor, an electric motor and a hydraulic motor. The transmission may comprise a spur gear assembly for operatively connecting the motor to the first and second drive rollers.

In an additional feature, the spur gear assembly comprises a first spur gear operatively connected to the motor and to the first drive roller for rotation about said first rotation axis and a second spur gear operatively connected to the second drive roller. The second spur gear operatively engages the first spur gear such that rotation thereof drives countersense rotation of the second spur gear about the second rotation axis.

In another feature, the spur gear is pivotably mounted to the frame. The pivoting of the spur gear in one direction improves a frictional engagement between the first and second drive rollers and the annular blade. The spur gear assembly may be pivotable about the first rotation axis of the first spur gear, which pivoting is controlled by springs to maintain contact with the annular blade and reduce oscillation and vibration of the pivoting spur gear assembly.

In another embodiment, a centerless cutting assembly is provided. The cutting assembly comprises a frame and at least a first and a second drive rollers mounted to the frame for rotation about first and second rotation axes. The cutting assembly further comprises an annular blade mounted between the first and second drive rollers and frictionally engaged thereby. At least two guide wheels are mounted to a frame cover mounted to the frame, the guide wheel operatively engaging the inner circular edge of the annular blade. A drive assembly is mounted to the frame for urging rotation of the first and second drive rollers, thereby urging rotation of the annular blade.

In one feature, the blade comprises at least one circular recess defined in at least one of the first and second faces and at least one of the first and second drive rollers comprises an annular protrusion extending from the curved face. The protrusion is receivable in the circular recess of the annular blade.

These and other objects, advantages and features of the present invention will become more apparent to those skilled in the art upon reading the details of the invention more fully set forth below.

BRIEF DESCRIPTION OF THE DRAWINGS

Having thus generally described the nature of the invention, reference will now be made to the accompanying drawings, showing by way of illustration an illustrative embodiment thereof, and in which.

DESCRIPTION OF THE ILLUSTRATIVE EMBODIMENTS

The description which follows, and the embodiments described therein are provided by way of illustration of an example, or examples of particular embodiments of principles and aspects of the present invention. These examples are provided for the purpose of explanation and not of limitation, of those principles of the invention. In the description that follows, like parts are marked throughout the specification and the drawings with the same respective reference numerals.

Figure 1:
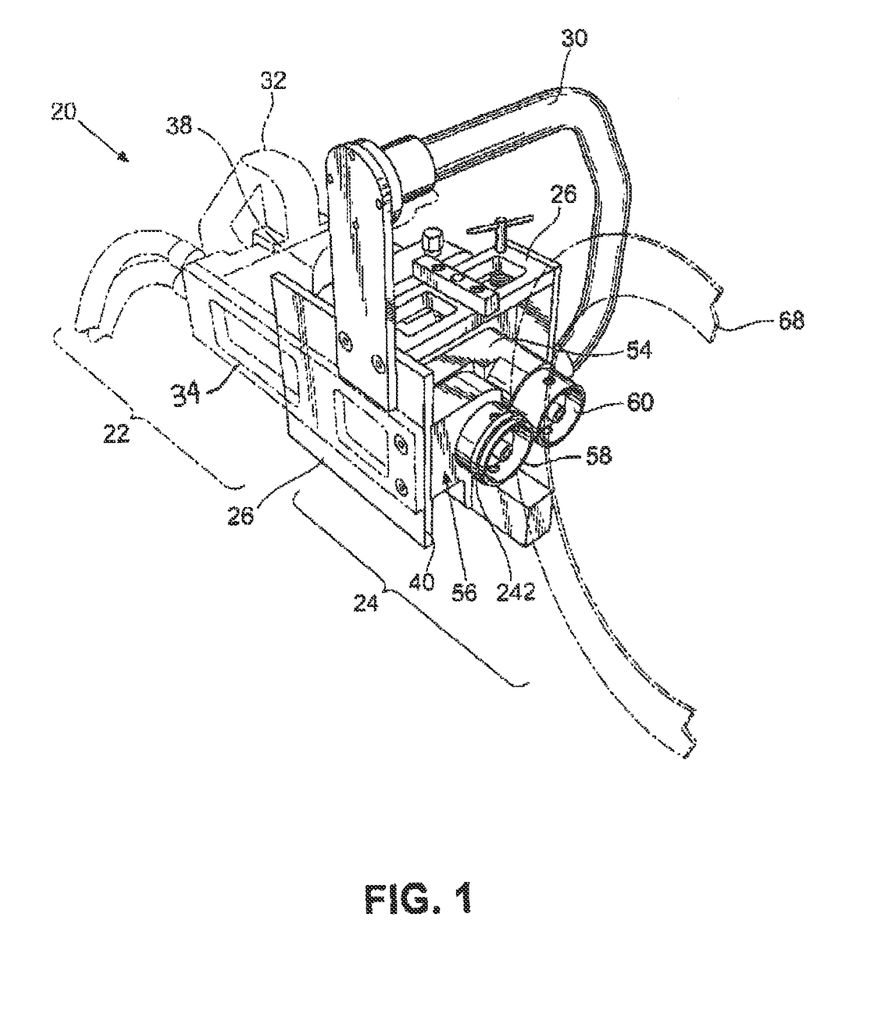
FIG. 1 is a front left perspective view of a centerless saw device with the cover removed, according to one embodiment of the present invention.
Figure 2:
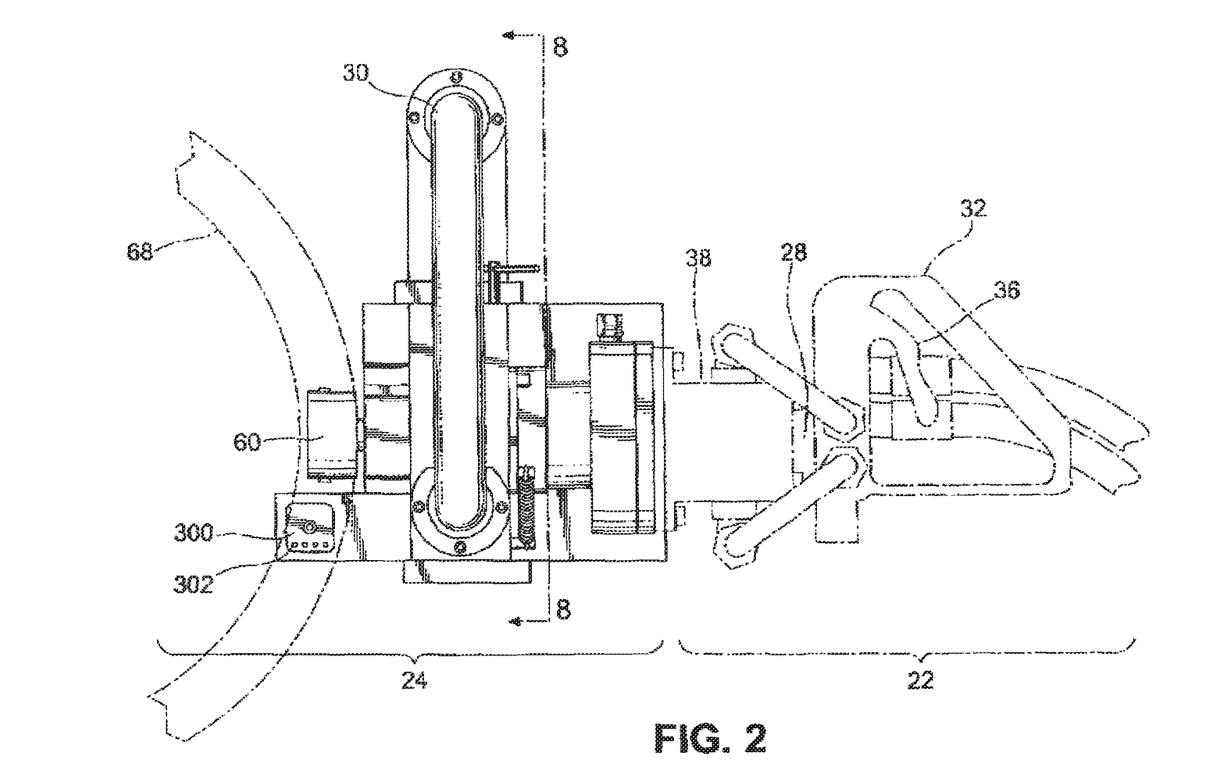
FIG. 2 is a side view of the centerless saw device, with the cover removed, according to one embodiment of the present invention.

With reference to FIGS. 1 and 2, a centerless handheld saw according to one embodiment of the present invention is shown using reference numeral 20. In this embodiment, the saw 20 comprises a drive assembly 22 and a cutting assembly 24 mounted to the drive assembly 22 by frame members 26.

With further reference to FIGS. 1 and 2, the drive assembly 22 comprises an hydraulic motor 40 mounted in a housing 28. Provided on the housing 28 is a plurality of handles 30, 32 for maneuvering the saw 20 and controls 36 (not shown) for controlling the throttle of the motor 40, and a bracket 34 for mounting the frame member 26 to the housing 28. Extending from the housing 28 is a drive shaft 94 (not shown) having a first end coupled to the motor and a second end extending from the motor housing 28 to the cutting assembly 24.

With further reference to FIGS. 1 and 2, while in this embodiment the cutting assembly 24 is coupled to a handheld driving assembly, a person skilled in the art will appreciate that such a cutting assembly 24 may also be coupled to different types of drive assemblies. For instance, the cutting assembly 24 could be mounted in table saw or compound saw configurations. Further, the cutting assembly 24 may be configured to be driven, for instance, by an electric or a gas motor.

With further reference to FIG. 1, the cutting assembly 24 comprises, from upstream to downstream (i.e. from the back end 38 of the frame 26 toward the front end thereof), a pivoting spur gear assembly 54 connected to the drive shaft 94 (not shown) and a mounting block 56 mounted to the frame 26 and connected to the pivoting spur gear assembly 54 as best described below.

With reference to FIGS. 1 to 4, the cutting assembly 24 further comprises first and second drive rollers 58, 60 operatively connected to, and driven by, the pivoting spur gear assembly 54, a cutting assembly cover 62 mounted to the front end of the frame 26 by means of a mounting bracket 52. The cover permits rotation of the annular blade 68 through its body, and a pair of guide wheel assemblies 64, 66 mounted to the cover 62, which guide and facilitate the movement of the annular blade 68. Sandwiched between the driving rollers 58, 60 and retained by the guide wheel assemblies 64, 66 is an annular blade 68. The cover 62 prevents material from entering the cutting assembly 24. Guide wheel assemblies 64, 66 facilitate the rotation of the annular blade and prevent the annular blade 68 from leaving the cutting assembly 24 and causing harm to the user. A blade guard 80 serves to protect the user's hands from the spinning annular blade 68. The guard 80 is affixed to the mounting bracket 52 by means of a bolt through the guard's mounting plate 82, which is screwed through the mounting bracket into the frame 26 and also serves to fasten the cover 62 on to the frame 26.

With further reference to FIG. 2, the water jet 300 is affixed to mounting block 56 and is positioned perpendicular to the rotation of the annular blade 68, such that it is able to spray water on the blade as it turns. In the present embodiment, the water jet 300 contains four nozzles 302, each of which sprays pressurized water. This water jet 300 cools and lubricates the blade 68 and cutting assembly 24 generally, as well as cleaning the circular recess 362 in the annular blade 68 of residue and dust.

Figure 3:
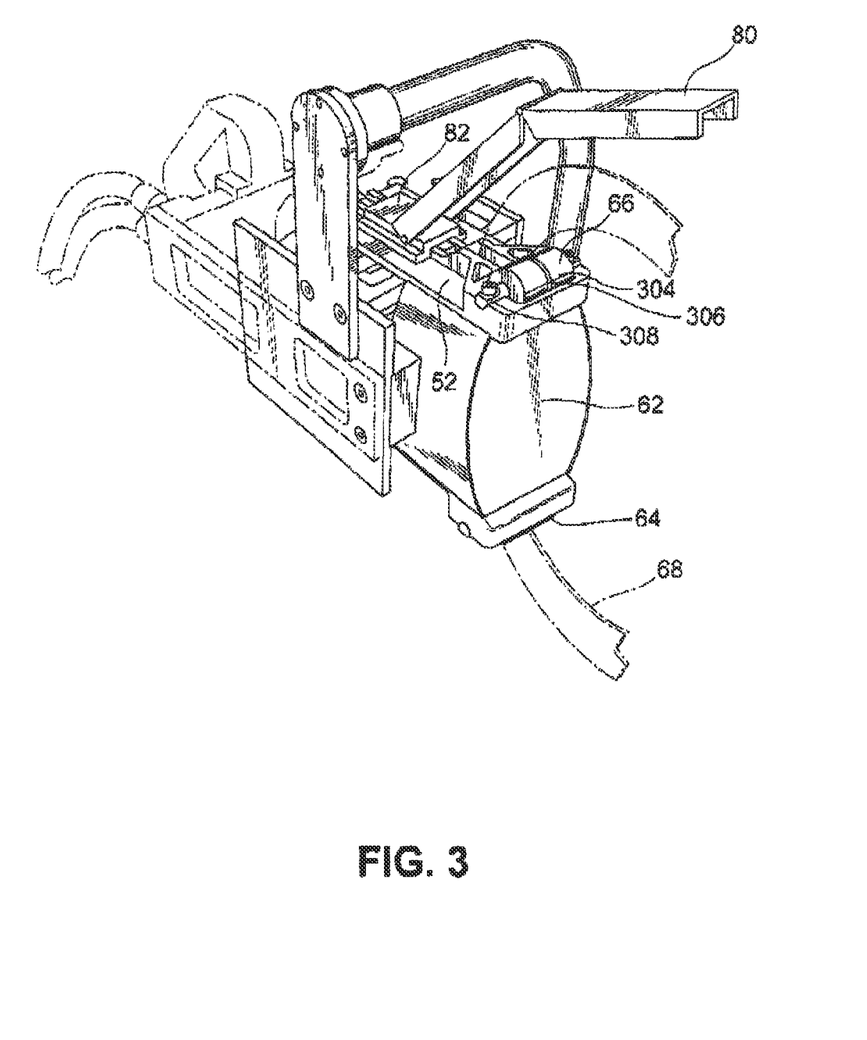
FIG. 3 is a front left perspective view of the centerless saw device, with the cover in place, according to one embodiment of the present invention.
Figure 4:
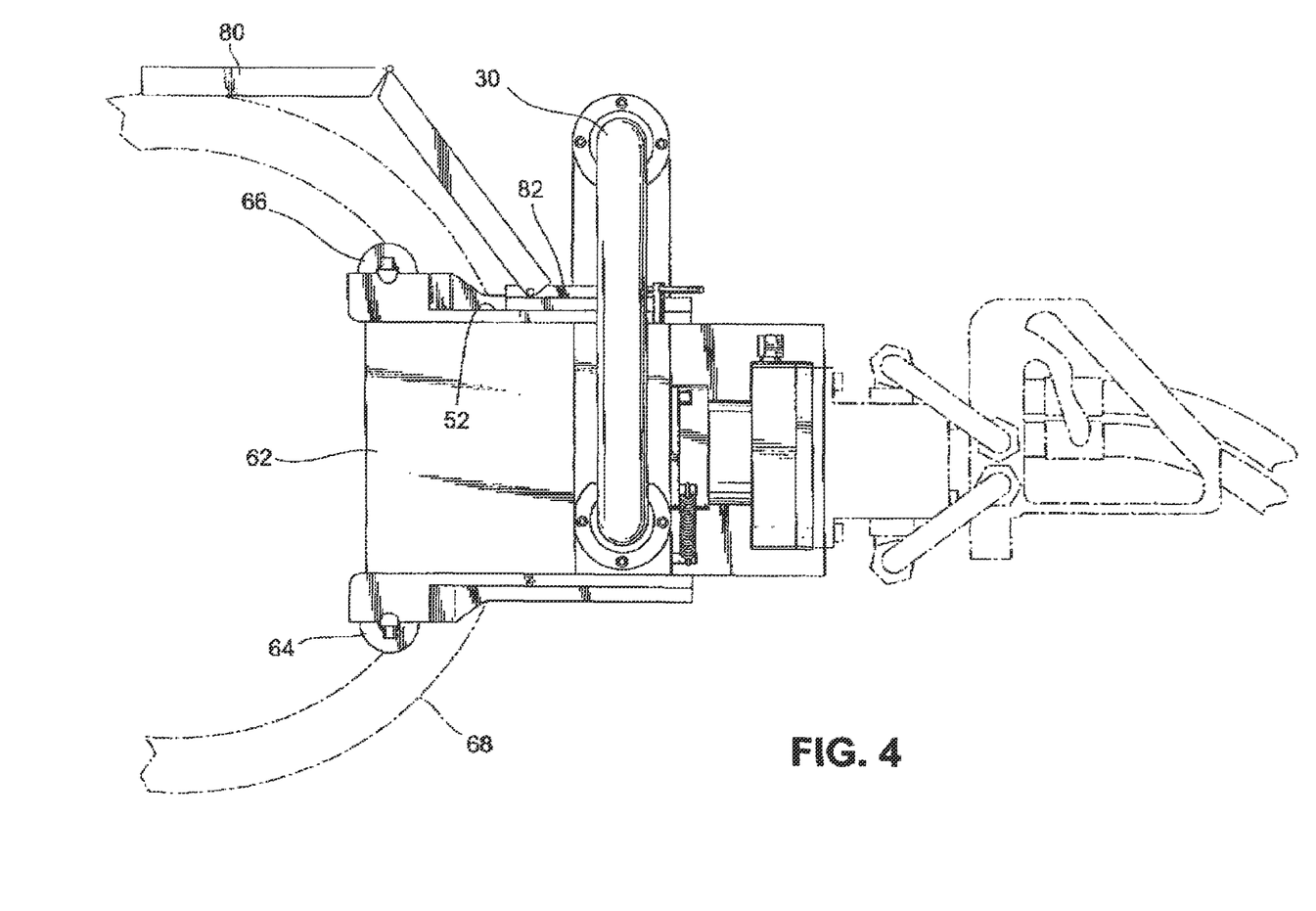
FIG. 4 is a side view of the centerless saw device, with the cover in place, according to one embodiment of the present invention.

Referring to FIGS. 3 and 4, the guide wheels assemblies 64, 66 will be described. The guide wheel assemblies 64, 66 being similar, only assembly 66 will be described. A person skilled in the art will appreciate that a similar description also applies to assembly 64. The guide wheel assembly 66, mounted within the corner of the cover 62 at the lower end of mounting bracket 52, comprises a cylindrical roller 304 containing a circumferential groove 306 at its midpoint. The groove 306 is sufficiently wide to accommodate the inside edge of the annular blade 68. The roller 304 is rotatably mounted on an axle 308 by means of one or more roller bearings (not shown), which permit the roller 304 to rotate freely on the axle 308. The water provided by the water jet 300 also serves to lubricate said roller bearings.

Figure 5:
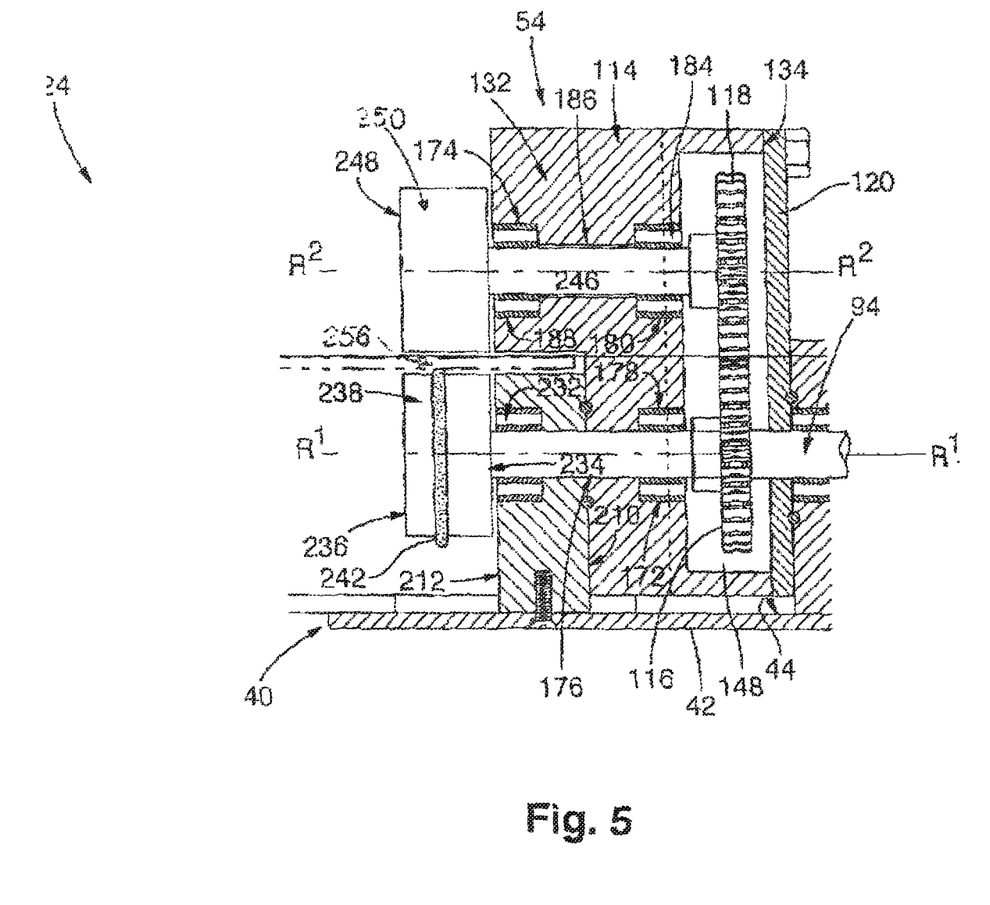
FIG. 5 is a side cut-away view of a pair of spur gears according to one embodiment of the present invention.

With reference to FIG. 5, the spur gear assembly 54 comprises a housing 114 adapted for receiving therein a pair of spur gears 116,118 operatively connected to the drive shaft 94 and a back plate 120 for closing the housing 114, as best described below. Further through the back plate 120 is a circular hole adapted for receiving therein the second end of the drive shaft 94, as best described below.

Figure 6:
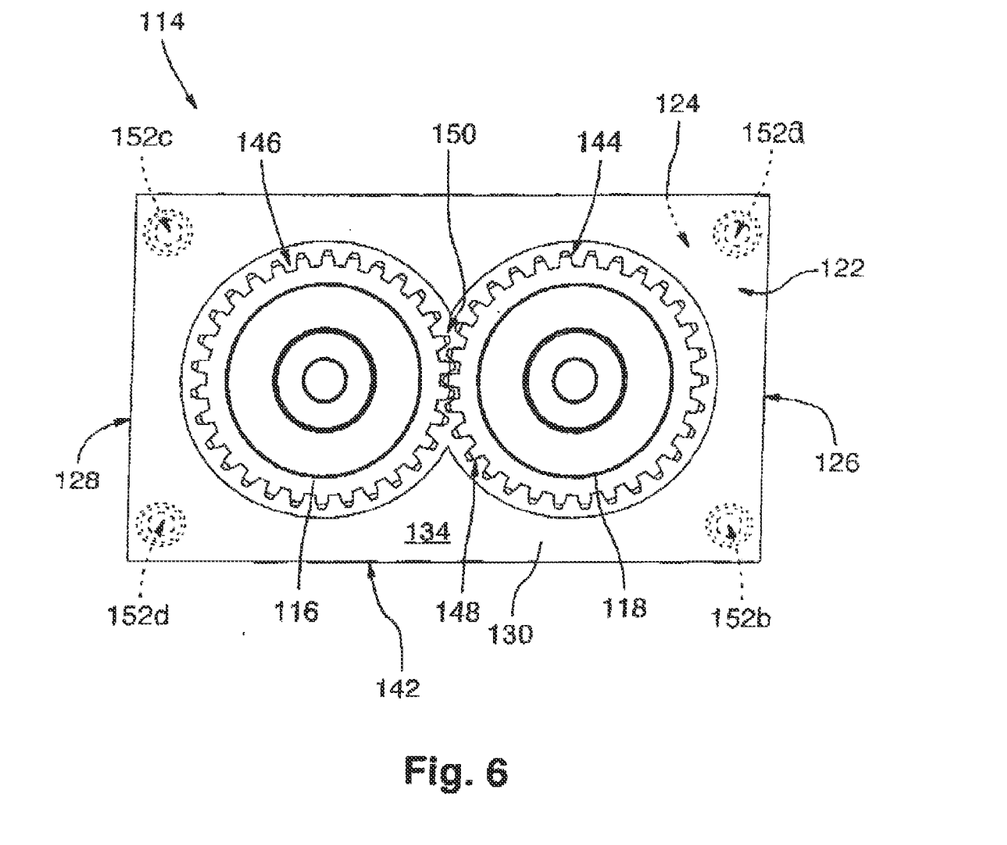
FIG. 6 is a rear cut-away view of a spur gear assembly according to one embodiment of the present invention.

With reference to FIG. 6, a view of the back face 134 of the housing 114, with the back plate 120 (not shown) removed, is shown as a rear view of the spur gear assembly 54 shown in FIG. 5, looking in through the back of the housing 114. The front 130 of the back face is the portion to which the back plate 120 (not shown) is affixed. For convenience, the back 124 of the back face 134, the top 126, the bottom 128 and the right side 142 are all labeled. Within the back face 134 is a pair of generally cylindrical recesses 144, 146 defining together a spur gear chamber 148 adapted for receiving therein the spur gears 116,118. The circular recesses 144, 146 are positioned in a side-by-side relationship and portions thereof overlap to define an opening 150 between them for allowing the spur gears 116,118 to engage one another. There are four screw holes 152a-152d by means of which the back plate 120 is fastened to the back face 134 of the housing 114.

Figure 7:
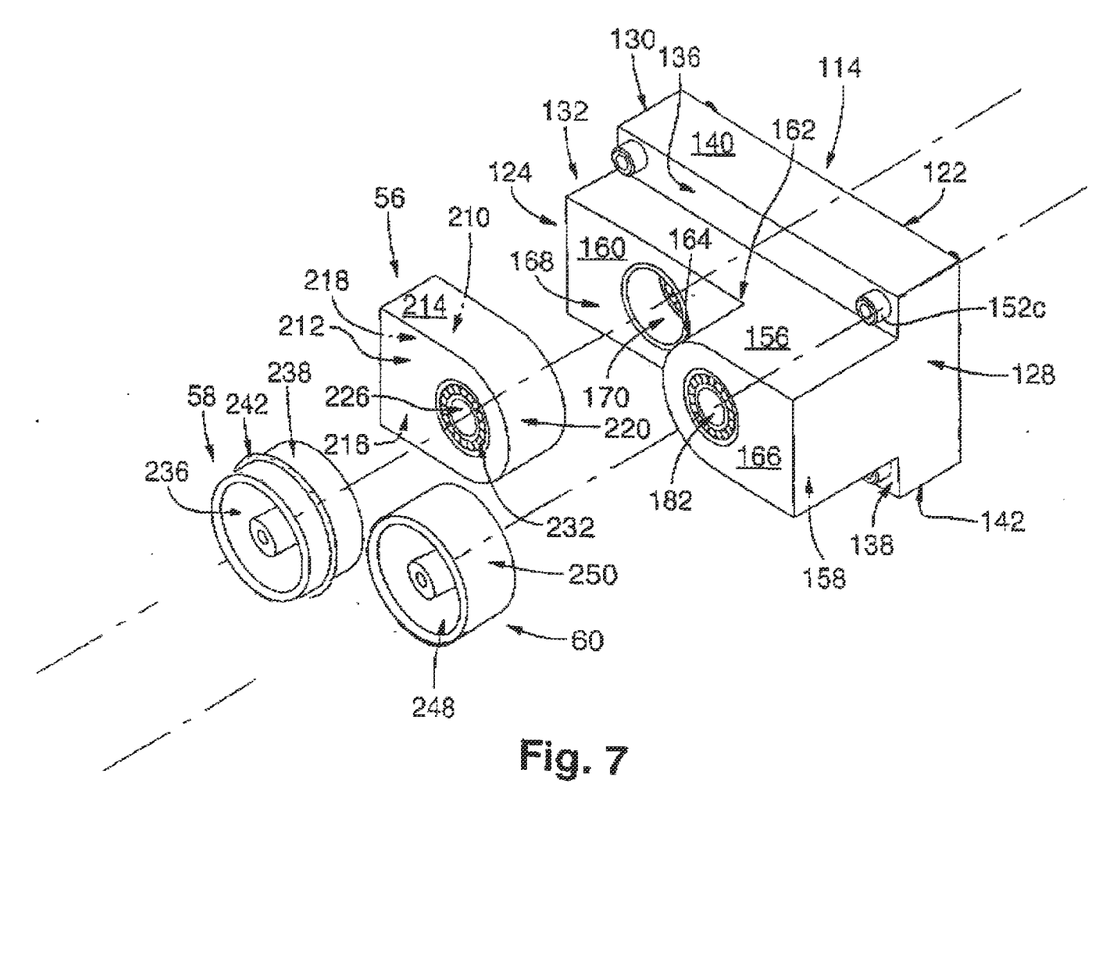
FIG. 7 is an enlarged exploded view of a cutting assembly, showing a spur gear housing, a mounting block and a pair of drive rollers, in accordance with one embodiment of the present invention.

With reference to FIG. 7, the generally L-shaped front portion 132 of the housing 114 will now be described. In one embodiment of the present invention, the front portion 130 comprises a L-shaped top face 156, a L-shaped bottom face 158, a rear face 122 and first front face 160 extending between the top and bottom faces 156,158, from the left face 124 of the housing 114 to a first intermediate region 162 located between the left and right side faces 124, 128. The front portion 132 also comprises a curved lateral face 164 extending frontwardly from the first front face 160 in a perpendicular relationship thereto, at the intermediate location 162. Connecting the top and bottom faces 156,158 and extending between the lateral face 164 and the right side face 128 of the housing 114 is a second front face 166 defining the frontmost portion of the housing 114. In this embodiment, the second face is parallel to the first face 160 (i.e. perpendicular to the side faces 126,128 of the housing 114 respectively).

With further reference to FIG. 7, the L-shape of the front portion 132 defines a seat 168 for receiving therein the mounting block 56 as it will be best described below. More specifically, the seat 168 is bordered by the first front face 166 (on the back of the seat 168) and by the lateral face 164 (on the right side of the seat 168).

As best shown in FIGS. 5 and 7, the housing 114 is provided with a first flanged hole 170 extending axially from the circular recess 144 to the first front face 160 of the front portion 132. In one embodiment, the hole 170 and the recess 144 share a common axis $R^1$-$R^1$, perpendicular to the first front face 160 and located halfway between the top and bottom faces 156,158 of the front portion 132.

With further reference to FIGS. 5 and 7, the flanged hole 170 comprises a circular back seat 172 extending frontwardly from the recess 144 and a main portion 176 extending between the back seat 172 and the first front face 160. The main portion 176 of the hole 170 has a diameter $D^1$ while the seat 172 has a larger diameter, $D^2$. Received in the seat 172 is an annular roller bearing 178 having an outer diameter corresponding to $D^2$ and an inner diameter corresponding to the diameter $D^1$ of the main portion 176. The presence of the bearing 178 is aimed at facilitating the rotation of the spur gears 116, 118 and drive rollers 58, 60 during operation of the saw 20, as it will become apparent below.

With further reference to FIGS. 5 and 7, the housing 114 is further provided with a second flanged hole 182 extending from the recess 146 to the second front face 166 of the front portion 132. Similarly to the first flange hole 170, the second flanged hole 182 extends axially from the recess 146 and share a common axis $R^2$-$R^2$ therewith, perpendicular to the second front face 166 and located halfway between the top and bottom faces 156,158 of the front portion 132. In one embodiment, the axes $R^1$-$R^1$ and $R^2$-$R^2$ of the holes 170, 182 extend parallel to one another and are aligned along a horizontal plan.

With further reference to FIGS. 5 and 7, the second flanged hole 182 comprises a circular back seat 184 extending frontwardly from the recess 146, a front seat 174 extending backwardly from the second front face 166 and a main portion 186 extending between the back and front seats 184, 174. The main portion 186 of the hole 182 has a diameter $D^1$ while the seats 184 have a larger diameter, $D^2$. Received in the seats 184, 174 are annular roller bearings 184, 180 similar to the bearing 178. As such, the bearings 188, 180 each have an outer diameter corresponding to $D^2$ and an inner diameter corresponding to the diameter $D^1$ of the main portion 186.

In one embodiment, the spur gear housing 114 is monolithic housing machined from a single block of aluminum. A person skilled in the art will however appreciate that the back and front portions of such housing may be distinct components assembled to one another by welding, screws or nuts and bolts.

With further reference to FIG. 5, the drive shaft 94 turns spur gear 116 in a clockwise direction, and accordingly spur gear 118 is driven in a counterclockwise direction, in turn driving the spur shaft 246. In one embodiment of the present invention, the spur gears have a 1:1 ratio to provide a synchronized rotation of the gears 116, 118. In the present embodiment, the chamber 148 is filled with oil for lubricating the spur gears 116, 118 and is closed by back plate 120, preventing debris from entering the spur gear assembly 54.

With further reference to FIG. 7, mounted in the seat 168 of the housing 114 is the mounting block 56. The mounting block 56 has a back face 210, a front face 212 and top and bottom faces 214, 216. The mounting block 56 also comprises a left flat face 218 and a curved right face 220. A circular flanged hole 226 extends between the back and front face 210,212 of the mounting block 56. The flanged hole 226 comprises a main portion having a diameter $D^1$ and a circular front seat (not shown) extending backwardly from the front face 212. The seat 230 has a larger diameter, $D^2$. Received in the seat (not shown), is an annular roller bearing 232 having an outer diameter corresponding to $D^2$ and an inner diameter corresponding to the diameter $D^1$ of the main portion (not shown). In one embodiment, the depth of the mounting block 56 (i.e. the distance between the back and front faces 210, 212) corresponds to the depth of the seat 168 of the spur gear housing 114 (i.e. the distance between the first and second front faces 160,166).

With further reference to FIGS. 5 and 7, the left face 126 of the spur gear housing 114 and the back plate 120 mounted thereto are spaced apart from the right face 44 of the frame 26. The housing 114 and the back plate 120 mounted thereto are not attached to the frame 26 but are rather maintained in position by the drive shaft 94. As the drive shaft 94 extends sequentially, from upstream to downstream, through holes 170 and 226, of the spur gear housing 114 and the mounting block 56 (also mounted to the frame 26), respectively, the housing 114 of the spur gear assembly 54 can pivot along the rotation axis $R^1$-$R^1$ of the drive shaft 94. In other words, this configuration enables the right side of the spur gear housing 114 to pivot upwardly and downwardly between an upper position and a lower position, as shown in FIG. 8.

Figure 8:
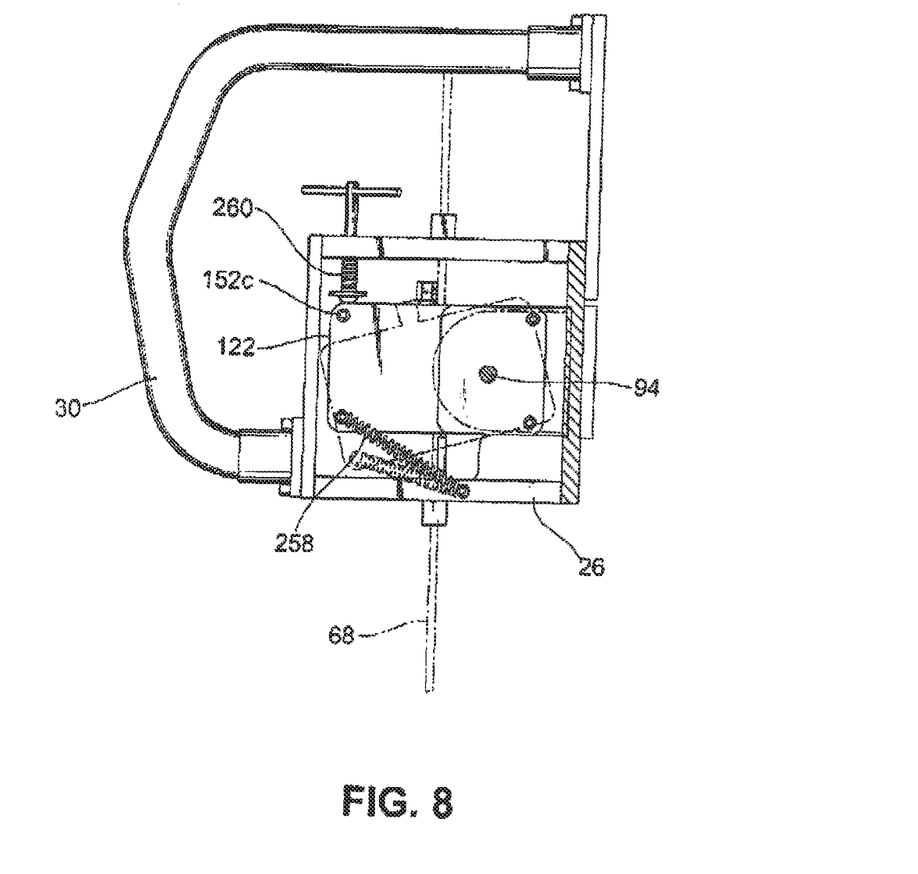
FIG. 8 is a partial cross-section view of the cutting assembly, shown from reference marked as "8" in FIG. 2, according to one embodiment of the present invention.

Referring to FIG. 8, which provides a partial cross-sectional view of the cutting assembly 24, as seen from the rear of housing 114, a first tension spring 258 is mounted by a first end to the rear face 122 of the housing 114, proximal to the right face 128 thereof, and by a second end to the frame 26. The tension spring 258 helps maintaining the housing 114 in its lower position thereby ensuring proper contact between the drive rollers 58, 60 (not shown) and the blade 68, as best described below. A second damping spring 260 maintains opposite pressure on the housing 114, compared with spring 258, damping the vibration and oscillation that occurs between drive rollers 58, 60 (not shown), when the blade 68 is spinning. The damping spring 260 is mounted on a "T" handle, which allows the operator to compress the damping spring 260 and lock it in such a compressed state, by pulling the handle and turning it once pulled, so as to freely move the housing 114, during servicing of the cutting assembly 24.

Returning to FIG. 5, the rectangular front end of the drive shaft 94 protrudes frontwardly from the front face 212 of the mounting block 56 for operatively mounting the drive roller 58 to the drive shaft 94 using a screw-type fastener, once the housing 114 and the mounting block 56 are mounted to the frame 26.

Figure 10:
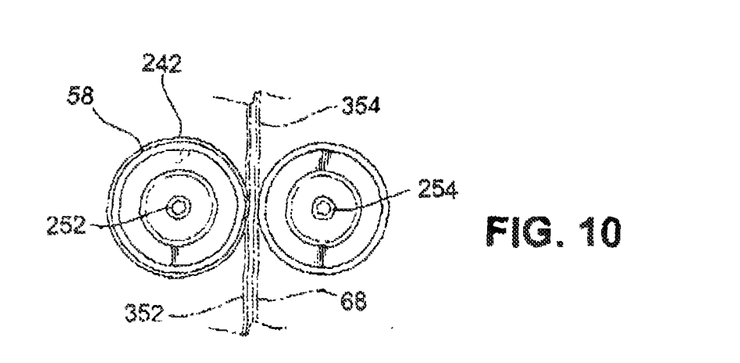
FIG. 10 is a detail of one aspect of the cutting assembly, showing the blade and the drive rollers, according to one embodiment of the present invention.

Referring to FIGS. 1, 5 and 10, the drive roller 58 is a generally cylindrical body comprising a circular back face 234, a countersunk circular front face 236 and a curved face 238 extending therebetween. Extending axially from the back face 234 to just short of the front face 236 is a rectangular hole (not shown) having a width $D^1$. An annular protrusion 242 extends radially on the curved face 238 of the roller 58 for guiding the annular blade 68. In order to place the blade 68 between rollers 58, 60, roller 60 must be removed by removing the screw 254 from the threaded socket on the front tip of the spur shaft 246, which screw is holding roller 60 in place. The blade 68 may then be slid in between the roller 58 and spur shaft 246. Once the blade 68 is in position, the annular protrusion 242 enters a corresponding groove on the side of annular blade 68. Once the roller 60 is slid back onto spur shaft 246, and the screw 254 is tightened into the threaded socket on the front tip of the spur shaft 246, said groove forms an interface with the annular protrusion 242 such that the blade cannot leave rollers 58, 60 once mounted therebetween, without removal of roller 60.

With further reference to FIGS. 1, 5 and 10, the roller 58 is mounted to the rectangular front end of drive shaft 94 by means of a corresponding rectangular recess in the back face 234 of the roller, said back face 234 being adjacent to the front face 212 of the mounting block 56. The roller 58 is maintained into position using a screw 252 fastened into the threaded socket located in the front end of the drive shaft 94. For ensuring proper rotation of the drive roller 58 along the axis $R^1$-$R^1$ and preventing slippage, the rectangular recess in the back face 234 engages the rectangular end of the drive shaft 94.

With further reference to FIGS. 5, 7 and 10, similarly to drive roller 58, drive roller 60 is a generally cylindrical body comprising a circular back face, a countersunk circular front face 248 and a curved face 250 extending therebetween. Extending axially from the back face to just short of the front face 248 is a rectangular recess. The roller 60 is mounted by means of said rectangular recess on the rectangular front end of the spur shaft 246, the back face thereof being adjacent to the second front face 166 of spur gear housing 114. The drive roller 60 is maintained into position using a screw 254 fastened into the threaded socket located in the front end of the spur shaft 246. For ensuring proper rotation of the drive roller 60 along the axis $R^2$-$R^2$ while the spur shaft 246 is rotated, the end of the spur shaft 246 which enters the rectangular recess in drive roller 60 is rectangular in cross-section.

As best shown in FIG. 5, a space 256 is defined between the curved faces 238, 250 of the drive rollers 58, 60. This space 256 is adapted for the curved faces 238, 250 of the drive rollers 58, 60 to frictionally engage the annular blade 68, as it will become apparent below. As such, the diameter of the drive rollers 58, 60 may be adjusted according to the thickness of the blade 68. However, where such adjustment occurs, the diameter of the first drive roller 58 preferably remains similar the diameter of the second drive roller 60 for the driving speed of the rollers 58 and 60 to remain identical. Because the spur gear housing 114 can pivot along the axis $R^1$-$R^1$, as shown in FIG. 5, the distance 256 between the curved faces 238, 250 of the drive rollers 58, 60 can be modified as the saw 20 is operated, as will become apparent below.

Figure 9:
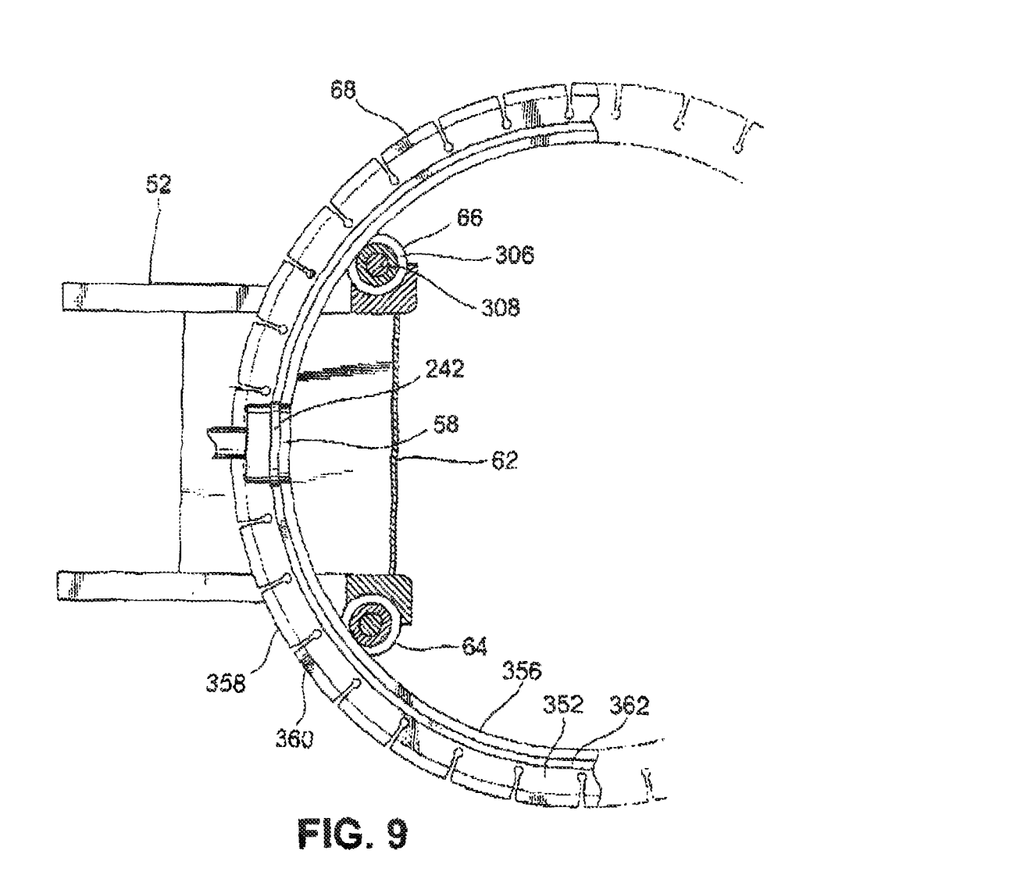
FIG. 9 is partial cross-section view of the cutting assembly, viewing through the cover, according to one embodiment of the present invention.

With reference to FIG. 9, the annular blade 68 will now be described. The blade 68 comprises left and right annular faces 352, 354 (not shown) respectively a circular inner edge 356 and a circular outer edge 358 defined on or projecting radially from the outer edge 358 is a plurality of carbide or diamond teeth 360 adapted for cutting materials such as concrete, asphalt, wood and the like. In one embodiment, the left face 352 of the blade 68 provided with is a circular recess 362. The recess 362 is adapted for receiving therein the annular protrusion 242 of the drive roller 60.

With reference to FIGS. 9 and 10, once assembled on the saw 20, the inner edge 356 of the blade 68 is received on the groove 306 of guide wheels 64, 66 (best shown in FIGS. 3 and 4) and is sandwiched between the drive rollers 58, 60 (best shown in FIGS. 1, 5, 7 and 10). More specifically, the curved face 238 of the drive roller 58 contacts the left face 352 of the blade 68, the annular protrusion 242 extending in the circular recess 362, while the curved face 250 of the roller 60 contacts the right face 350 of the blade 68. The presence of the spring 258 ensures that a proper contact is maintained between the drive rollers 58, 60 and the faces 352, 354 of the blade 68 during the operation of the saw 20, and damping spring 260 prevents oscillation of the drive rollers 58, 60 while blade 68 is spinning.

With further reference to FIG. 9, as the guide wheels 64, 66 are located proximal to the drive rollers 58, 60, the major portion of the blade 68 can be used for cutting. This provides the saw 68 with cutting capabilities extending beyond the rotation axis of the blade 68, which may not be possible with saws of the prior art, where a driving shaft extends along the rotation axis of the blade and prevents the blade from cutting beyond the rotation axis of the blade.

Having described the general components of the saw 20, the assembly of the blade 68 to the saw 20 and its operation will now be described. With reference to FIGS. 1, 3 and 5, the cover 62 is removed so that the drive rollers 58, 60 are exposed. The operator then widens the gap 256 between rollers 58 and 60 by pivoting the spur gear housing 114. The annular blade 68 is then placed between the drive rollers 58, 60, and the annular protrusion 242 on drive roller 58 enters a corresponding groove (not shown) on the side of annular blade 68. Once the pivoting spur gear housing 114 is released, the spring 258 pulls the gap 256 closed, to form an interface with the annular protrusion 242 such that the blade cannot leave rollers 58, 60 once mounted therebetween.

With further reference to FIGS. 1, 3 and 5, in this position, the curved faces 238, 250 of the drive rollers 58, 60 contact the left and front faces 352, 354 of the blade 68 and the protrusion 242 extends in the recess 362. Once the blade 68 is properly positioned between the drive rollers 58, 60, the cover 62 is replaced, and the blade 68 contacts guide wheel assemblies 64, 66, so that the inside edge of the annular blade 68 is positioned within the groove 306, preventing the blade from sliding side-to-side along the roller 306. As shown in FIG. 3, the mounting brackets 52 of cover 62 are then fastened to the frame 26 by means of a bolt fastened through the guard's mounting plate 82, in order to prevent the unintentional removal of cover 62.

With reference to FIGS. 1, 3 and 5, the blade 68 being now in position between the drive rollers 58, 60 and supported by the guide wheel assemblies 64, 66, the saw 20 can be operated. The motor of the drive assembly is actuated and speed thereof is controlled by the operator. The motor causes the drive shaft 94 coupled to the motor to rotate, which in turn drives countersense rotation of the spur gears 116, 118. More specifically, the spur gear 116 rotates counterclockwise while the spur gear 118 rotates clockwise, therefore driving the rollers 58, 60 to rotate accordingly in a 1:1 ratio.

With reference to FIGS. 5 and 9, the curved faces 238, 250 of the drive rollers 58, 60 frictionally engage the left and right faces 352, 354 of the blade 68 for causing rotation thereof about the virtual axis through the centre of the blade diameter. The protrusion 242 of the drive roller 58 engaged in the recess 362 of the blade enhances the frictional engagement of the roller 58 with the blade 68, thus increasing the efficiency of the drive rollers 58, 60 and providing the saw 20 with sufficient torque for enabling cutting action the midway point of the diameter of the blade, and allows cutting action to continue until the saw is embedded up to the cover 94. Further, the protrusion 242 engaged in the recess 362 prevents the blade 68 from moving backwardly during the operation of the saw 20, which backward movement of the blade 68 could damage the other components of the saw (e.g. the spur gear housing 114 located behind the blade). In an alternate embodiment, the blade 68 may be provided with one recess on each of its faces 352, 354 (i.e. one recess on the left face 352 and one recess of the right face 354) and both rollers 58, 60 may be provided with corresponding annular protrusions similar to protrusion 242. In a further alternate embodiment, the blade may have more than one recess on each of its faces 352, 354 (i.e. multiple recesses on the left face 352 and multiple recesses of the right face 354) and both rollers 58, 60 are provided with corresponding annular protrusions similar to protrusion 242. In another embodiment, the one or more recesses on each of the left and right faces 352, 354 may be staggered or offset with each other, so as to minimize the weakening of the structure of the annular blade. In a further alternate embodiment, the curved faces 238, 250 of the drive rollers 58, 60 could be layered with rubber or the like to further enhance frictional engagement with the blade 68. In yet a further embodiment, the circular inner edge 356 of the blade 68 is reinforced with more material or a stronger material, such as high-carbon steel, so that it is more durable and does not wear down too quickly.

With reference to FIGS. 5 and 9, as it will be apparent for a person skilled in the art, the countersense rotation of the rollers 58, 60 will cause the blade 68 to rotate counterclockwise in this configuration. This person will appreciate that the saw could be configured differently for the blade to rotate clockwise. With further reference to FIG. 9, a person skilled in the art will appreciate that this configuration of the guide wheels enables using blades having different configurations, for instance blades having different diameters. In one embodiment, the blade has an inner diameter (i.e. the diameter defined by the inner curved edge) ranging from about 10 inches and 20 inches and an outer diameter ranging from about 3 to about 50 inches, preferably between about 5 and 24 inches, and more preferably between about 10 to 20 inches. Where the inner diameter of the blade 68 is smaller, it may be desirable to rearrange the guide wheel assemblies 64, 66 in a compact configuration, wherein they are moved closer to one another by means of different cover than that specified in the present embodiment. The present invention encompasses blade sizes with outside diameters of up to and greater than 5 feet, these large blades typically being employed in a table-saw-like configuration, used for cutting granite for example.

Although the foregoing description and accompanying drawings relate to specific preferred embodiments of the present invention as presently contemplated by the inventor, it will be understood that various changes, modifications and adaptations, may be made without departing from the invention.

The invention claimed is:

1. A centerless cutting assembly comprising:
   a frame;
   a first drive roller mounted to said frame for rotation about a first rotation axis;
   a second drive roller mounted to a pivoting housing, said roller rotating about a second rotation axis;
   an annular blade mounted between said first and second drive rollers frictionally engaged thereby, the annular blade defining frontward and backward hemispheres;
   guide wheels mounted to said frame and operatively engaging an inner circular edge of said annular blade; and
   a drive assembly mounted to said frame for urging rotation of said first and second drive rollers, thereby urging rotation of said annular blade; said drive assembly comprising:
   a motor and a transmission operatively coupled to said motor, said transmission comprising a spur gear assembly operatively connecting said first drive roller and said second drive roller to said motor, said spur gear assembly comprising:
   a housing;
   a first spur gear operatively connected to said motor and to said first drive roller for rotation about said first rotation axis;
   a second spur gear operatively connected to said second drive roller; said second spur gear operatively engaging said first spur gear so that rotation of said first spur gear drives opposite rotation of said second spur gear about said second rotation axis;
   said spur gear assembly being pivotally mounted to said frame for pivoting upwardly and downwardly between an upper position and a lower position;
   a spring mounted to the housing and to the frame to help maintain the spur gear assembly in the lower position, ensuring contact between the first and second drive rollers and the blade.

2. The centerless cutting assembly of claim 1, wherein said cutting assembly comprises a handheld saw device.

3. The centerless cutting assembly of claim 1, wherein said transmission is adapted to drive an opposite rotation of said first and second drive rollers in a 1:1 ratio.

4. The centerless cutting assembly of claim 1, wherein said motor is selected from the group consisting of a gas motor, an electric motor and a hydraulic motor.

5. The centerless cutting assembly of claim 1, wherein said transmission further comprises a bevel gear assembly operatively connecting said first spur gear to said motor.

6. The centerless cutting assembly of claim 1, wherein said frame extends a distance from said frontward hemisphere.

7. The centerless cutting assembly of claim 1, wherein said guide wheels are positioned in the backward hemisphere of said annular blade, wherein said inner circular edge of the annular blade is in contact with said guide wheels proximal to the first and second drive rollers.

8. A centerless saw device comprising:
   a frame;
   a first drive roller and a second drive roller mounted to said frame for rotation about respective first and second parallel rotation axes, the first and second drive rollers being positioned to define a space there between and be operable to rotate opposite to one another, each of the first and second drive rollers comprising a curved face;
   an annular blade mounted between said curved faces of said first and second drive rollers frictionally engaged thereby, the annular blade comprising a first annular face, an opposed second annular face, an inner curved edge and an outer curved edge, said curved face of said first drive roller frictionally engaging said first annular face of said annular blade and said second drive roller frictionally engaging said second face of said annular blade for driving the rotation of said annular blade about a third rotation axis perpendicular to said first and second rotation axes;
   two guide wheels mounted to said frame, said guide wheels being rotatable about fourth and fifth rotation axes parallel to said third rotation axis;
   a drive assembly mounted to said frame operable for urging opposite rotation of said first and second drive rollers, thereby urging rotation of said annular blade; said drive assembly comprising:
   a motor and a transmission operatively coupled to said motor, said transmission comprising a spur gear assembly operatively connecting said first drive roller and said second drive roller to said motor, said spur gear assembly comprising:

a housing;

a first spur gear operatively connected to said motor and to said first drive roller for rotation about said first rotation axis;

a second spur gear operatively connected to said second drive roller; said second spur gear operatively engaging said first spur gear such that rotation of said first spur gear drives an opposite rotation of said second spur gear about said second rotation axis;

said spur gear assembly being pivotally mounted to said frame for pivoting upwardly and downwardly between an upper position and a lower position;

a spring mounted to the housing and to the frame to help maintain the spur gear assembly in the lower position, ensuring contact between the first and second guide rollers and the blade;

said two guide wheels being mounted to said frame between said third rotation axis and said first and second drive rollers, wherein said inner curved edge of the annular blade is in contact with the guide wheels proximate said first and second drive rollers, each guide wheel comprising an annular recess aligned with said space defined between said first and second drive rollers and receiving therein said inner edge of said annular blade.

9. A centerless saw device according to claim 8, wherein said annular blade comprises at least one annular recess defined in at least one of said first face and said second face and at least one of said first drive roller and said second drive roller comprises an annular protrusion extending from said curved face, said protrusion being receivable in said circular recess of said annular blade.

* * * * *